United States Patent
Nachef et al.

(10) Patent No.: US 7,127,703 B1
(45) Date of Patent: Oct. 24, 2006

(54) METHOD FOR CONTROLLING A FUNCTION EXECUTABLE BY SPECIFIC COMMANDS TO DIFFERENT SOFTWARE PRODUCTS

(75) Inventors: Armand Nachef, Le Bretonneux (FR); Jean-Michel Ravon, Saint-Cyr l'Ecole (FR); Gérard Sitbon, Paris (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/582,755

(22) PCT Filed: Oct. 28, 1999

(86) PCT No.: PCT/FR99/02629

§ 371 (c)(1),
(2), (4) Date: Nov. 3, 2000

(87) PCT Pub. No.: WO00/26774

PCT Pub. Date: May 11, 2000

(30) Foreign Application Priority Data

Oct. 30, 1998 (FR) .................................. 98 13645

(51) Int. Cl.
*G06F 9/44* (2006.01)
(52) U.S. Cl. ............... 717/108; 717/115; 717/116; 717/121
(58) Field of Classification Search .......... 717/137, 717/143, 149, 106–109, 114–121
See application file for complete search history.

(56) References Cited

U.S. PATENT DOCUMENTS 5,228,118 A * 7/1993 Sasaki ..................... 358/1.13
5,566,278 A * 10/1996 Patel et al. ............... 358/1.15
5,634,016 A * 5/1997 Steadham et al. ......... 345/753
5,678,047 A * 10/1997 Golshani et al. .......... 717/138
6,148,346 A * 11/2000 Hanson ..................... 709/321
6,434,694 B1 * 8/2002 Slaughter et al. .......... 713/1
6,578,090 B1 * 6/2003 Motoyama et al. ........ 709/315

FOREIGN PATENT DOCUMENTS

WO        WO 96 37825 A        11/1996

OTHER PUBLICATIONS

Osamu Mikami et al: "Heterogeneous Computing Enviornment Couple" NEC Research and Dev., vol. 32, No. 1, Jan. 1, 1991. p. 130-141.
Showman P.S.: "An Object Based User Interface for the HP Newwave Environment" Hewlett-Packard Journal, vol. 40, No. 4, Aug. 1, 1989, pp. 9-17.

* cited by examiner

*Primary Examiner*—Ted T. Vo
(74) *Attorney, Agent, or Firm*—Miles & Stockbridge P.C.; Edward J. Kondracki (57) ABSTRACT

The method is used to control a function executable by various software products by means of commands specific to the respective software products and each capable of having at least one option, the software products being installed in at least one machine of a computer system. The method includes defining in an abstract class an abstract method for the function, of defining a common command that includes arbitrary symbols corresponding to the parameters of the abstract method, of creating at least one driver for implementing the abstract method in a machine, and having the driver execute one of the specific commands with options equivalent to the options of the common command.

21 Claims, 6 Drawing Sheets

| File | Documents | .... | ... | Preferences | | Help |
|------|-----------|------|-----|-------------|---|------|
| | Open... | | | Display | | |
| | Search | | | Display history | | |
| | Save the class | | | Save | | |
| | Save the class as... | | | Save as... | | |
| | Close the class | | | Close | | |

```
        Boolean
        Character
        Double
        Float
        Integer
        Long
        String
        Void List of Boolean
        List of Character
        List of Double
        List of Float
        List of Integer
        List of Long
        List of String
```

METHOD FOR CONTROLLING A FUNCTION EXECUTABLE BY SPECIFIC COMMANDS TO DIFFERENT SOFTWARE PRODUCTS

CROSS REFERENCE TO RELATED APPLICATIONS

The subject matter of this application is related to (1) application Ser. No. 09/582,702, filed on Jun. 30, 2000, in the names of Armand NACHEF and Jean-Michel RAVON, entitled "METHOD FOR AUTOMATICALLY GENERATING IN AN OBJECT-ORIENTED LANGUAGE A DRIVER FOR IMPLEMENTING AN ABSTRACT METHOD OF AN ABSTRACT CLASS, and corresponding to French Application No. 98 13644 and PCT application No. PCT/FR99/02633, (2) application Ser. No. 09/582,762, filed on Jun. 30, 2000, in the name of Jean-Marc GOUBE, Armand NACHEF and Gerard SITBON, entitled "METHOD FOR GENERATING INTERFACES FOR CONTROL BY A COMPUTER SYSTEM USER", and corresponding to French Application No. 98/13642 and PCT application No. PCT/FR99/02632;

(3) application Ser. No. 09/582,701, filed on Jun. 30, 2000, in the names of Armand NACHEF and Gerard SITBON, entitled "DERIVING AN OBJECT CLASS BY INHERITANCE, INSTANTIATION OR CLONING" and corresponding to French Application No. 98/13643 and PCT application No. PCT/FR99/02630, and (4) application Ser. No. 09/582,757, filed on Jun. 30, 2000, in the names of Armand NACHEF and Gerard SITBON, entitled "DYNAMIC CREATION OF OBJECT CLASSES" and corresponding to French Application No. 98/13641 and PCT application No. PCT/FR99/02634, the subject matter of each of said U.S. applications is hereby incorporated by reference.

FIELD OF THE INVENTION

The subject of the invention is a method for controlling a function executable by commands specific to different software products in a computer system. It is suitable for any system and is particularly adapted to a highly heterogenous system.

DESCRIPTION OF RELATED ART

A company's computer system is often heterogeneous, as a result of the historical evolution of the system and the products available on the market. In a computer system, there are one or more servers supporting several applications. The heterogeneity can be due to the fact that the servers have different operating systems from one another. For example, one of the servers can be a closed system, specific to a given manufacturer and running with an operating system specific to the manufacturer, while the other servers can be open systems running with operating systems that are different from one another, such as those known by the registered trademarks UNIX and Windows NT. Each operating system has specific commands, written in a specific language. Consequently, the operation of a computer system requires the use of commands specific to each operating system and a knowledge of their languages.

The heterogeneity can also result from the applications. Several applications that are different from one another may have similar functional parts executable through command interfaces that are different from one another. For example, two software products as different as accounting software and database management software have the document printing function in common, whereas their commands are entirely different.

A user, whether an administrator or a person responsible for the operation of the computer system, must therefore know the different commands of the different operating systems and the different application software products. The user must therefore have both solid training for each system and each application and enough practice to run them quickly and efficiently. Moreover, the operating systems and especially the applications evolve very quickly and require user regular training and continuous use of the various systems and applications. When the applications have functions that are increasingly numerous and complex, the training time is even longer. The users often have access to online help documentation. However, the documentation is also specific and evolutive, and it is very inconvenient to use, especially if the help information requires the opening and the reading of several successive windows.

SUMMARY OF THE INVENTION

An object of the invention is to offer, in a computer system, a command common to all the commands representing the same function and specific to various software products, such as operating systems or applications.

The subject of the invention is a method for controlling a function executable by various software products by means of commands specific to the respective software products and each capable of having at least one option, the software products being installed in at least one machine of a computer system, characterized in that it consists of defining in an abstract class an abstract method for the function, the abstract method including parameters corresponding to the union, in the logical sense, of all the options of the specific commands, of defining a common command that includes arbitrary symbols corresponding to the parameters of the abstract method, of creating at least one driver for implementing the abstract method in a machine, and of having the driver execute one of the specific commands with options equivalent to the options of the common command.

The corollary subject of the invention is a computer system comprising at least one machine having various software products having in common at least one function executable by means of commands specific to the respective software products and each capable of having at least one option, characterized in that it implements the method defined above.

Another corollary subject of the invention is a recording medium, such as a magnetic disk or a CD-ROM, that incorporates a software product for implementing the method.

The characteristics and advantages of the invention appear in the following description, given as an example and written in reference to the attached drawings.

DESCRIPTION OF THE PREFERRED EMBODIMENT(S)

Figure 1:
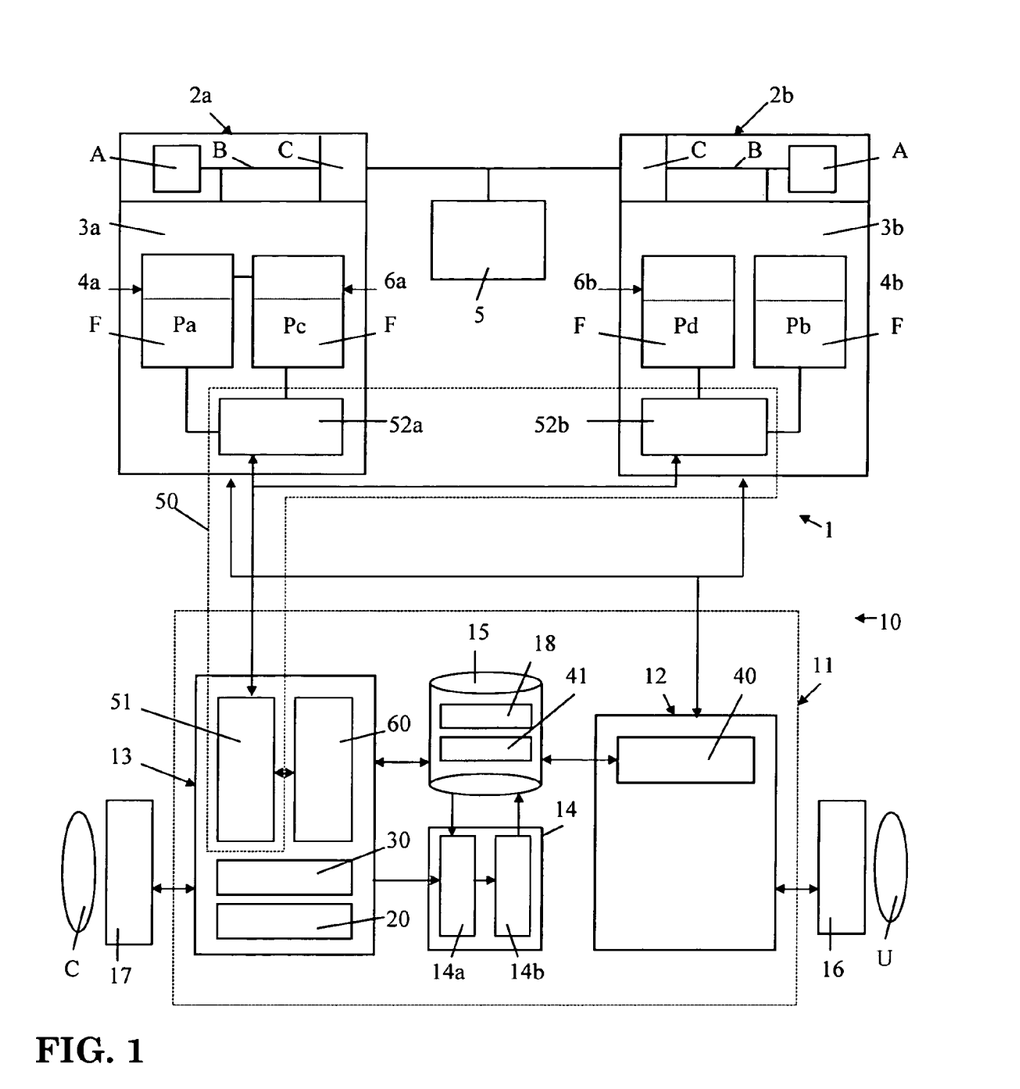
FIG. 1 is a block diagram of a computer system that implements the method of the invention.

FIG. 1 illustrates a computer system 10 operated by a user U by means of a command interface 11. The system 10 can be any type of system. The system 10 illustrated includes a computer infrastructure 1 comprising at least one machine, two machines 2a and 2b in the example illustrated. Each machine illustrated has, in a way that is well known, at least one processor A connected through a bus B to a memory 3. Generally, the memory can be local or distributed, or the machines can form nodes of a network within the infrastructure 1. Software means, including one or more operating systems 4, are stored in each memory 3. In order to better highlight the advantages of the invention, the system will be considered to be a heterogeneous system, representing a case that is difficult to handle. The two machines 2 are assumed to run on two respective operating systems 4a and 4b of different types or versions, for example an operating system of the proprietary type and an operating system of the open type, for example one known by either of the registered trade names UNIX or Windows NT. The computer infrastructure 1 also has database means, called a database 5, which can be constituted by one or more local or remote databases. The machines 2 each also have an input/output interface C connected to the bus B. The input/output interfaces C of the two machines are connected to one another as well as to the database 5.

The command interface 11 comprises a command module 12, a design module 13, an interface generator 14 and an interface base 15. The module 12 is connected by a two-way connection to the computer infrastructure 1. The interface base 15 is connected by a two-way connection to the modules 12 and 13 and to the generator 14. The generator 14 is also connected that it can be controlled by the module 13. The command module 12 is used by the user U to control and use the data of the system 10. The design module 13 is used by a designer C, who is another user of the interface 11 but who is a computer specialist. The two users U and C have respective consoles 16 and 17 attached to the respective modules 12 and 13.

In short, the user U defines needs in order to understand and improve the running of the company and submits his needs to the designer C. The designer C creates, by means of his module 13, software objects that meet the needs of the user U and sends them to the generator 14 to be converted into interfaces 18 (FIGS. 11 and 12) that correspond to his needs and express the commands of the system in a language that is understandable to him. These interfaces are used by the user to create documents and are called document interfaces.

The user U is, for example, a bank branch manager who is not a computer specialist. It is assumed, for example, that the user U wants to consult the bank's computer infrastructure 1 to perform queries in order to obtain a list of the students that are clients of the branch, and print personalized information, invitation and reminder letters for them. The user U transmits his needs to the designer C, for example during a meeting between them. The designer transcribes these needs using the module 13, in a first step, to create, modify and/or delete objects and object classes related to these needs. For example, in order to meet the above-mentioned need of the user U, the designer C will create a class "print" with: a first attribute "distribution list" based on a set of criteria, in this case the students of the branch; a second attribute "number of copies" (integer); a first method "print" having as a parameter the destination printer; and second method "display print jobs" in order to know the progress of the printing. The objects and classes created by the designer are stored in the interface base 15. The final transcription by the designer C of the needs of the user U is contained only in objects that have previously been directly created or that are instances of previously defined classes. These objects are contained in the base 15, which is contained in the command interface 11 in the example illustrated but which could be outside the interface 11 and included in the computer infrastructure 1. The objects are converted into document interfaces presented to the user U for him to use to create command documents that meet his needs.

The module 13 will be presented first. It uses two software tools 20 and 30, which respectively execute a process for dynamically creating classes and a process for deriving classes and objects. The tool 20 for dynamically creating classes will now be presented.

Figure 2:
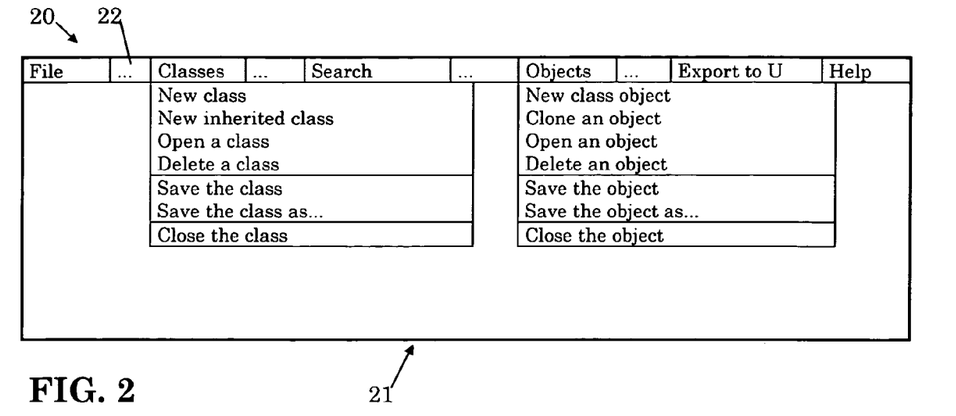
FIG. 2 is a window used by a designer to implement the method of the invention.

FIG. 2 illustrates an example of a screen 21 displayed on the console 17 that serves as an interface between the designer C and the module 13. The screen 21 has a menu bar 22, that includes in particular the menus "Classes," "Objects," "Search" and Export to U." The "Classes" menu makes it possible to dynamically create object classes, by inheritance or not. It also makes it possible to open a class, possibly in order to modify it, save it, or close it. The "Objects" menu makes it possible to instantiate the classes defined previously, in order to create objects, which can then be cloned. Just as for the classes, it is possible to open an object, modify it, save it on the disk and close it. With the tool 20, the designer C can define the commands that are found in both menus, as illustrated for example in those of the screen 21. The "Classes" menu illustrated contains the commands "New class," "New inherited class," "Open a class," "Delete a class," "Save the class," "Save the class as . . . " and "Close the class." The "Objects" menu contains the commands "New class object," "Clone an object," "Open an object," "Delete an object," "Save the object," "Save the object as . . . " and "Close the object."

The tool 20 implements a method for automatically generating an object class. The method is triggered automatically by the design module 13 when the designer C activates the command "New class" on the "Classes" menu in the window 22 of FIG. 2. The method for automatically generating a class consists of creating a global generic class "GenericClass" having two possible members, one of them being related to at least one attribute and the other being related to at least one method, at least one of the two members being an instance of a generic class, and of instantiating the global generic class in order to have said object class. In the tool 20 illustrated, two generic classes "GenericAttribute" and "GenericMethod" are assigned to the two respective members of the global generic class "GenericClass." Furthermore, if a method includes at least one parameter not fixed, this parameter is itself an instance of a corresponding generic class "GenericParameter."

Generally, the four generic classes thus created are not visible to the designer C. In the example illustrated, they are made available to the designer C when he executes a command in the "Classes" and "Objects" menus. Thus, a generic class is defined as a class that allows the designer C to create a new class by creating an instance of a global generic class. Since the creation of instances is dynamic in all languages, the creation of a class is also dynamic for the designer C. Likewise, given that an object is a new instance of a class, the creation of an object also corresponds to the creation of a copy of this class, i.e., to a new instance of a global generic class. Consequently, the process triggered by the tool 20 is also triggered when the designer C activates the command "New class object" in the "Objects" menu in the window 22 of FIG. 2. The method will now be illustrated in the way that it is presented to the designer C by the tool 20.

Figure 3:
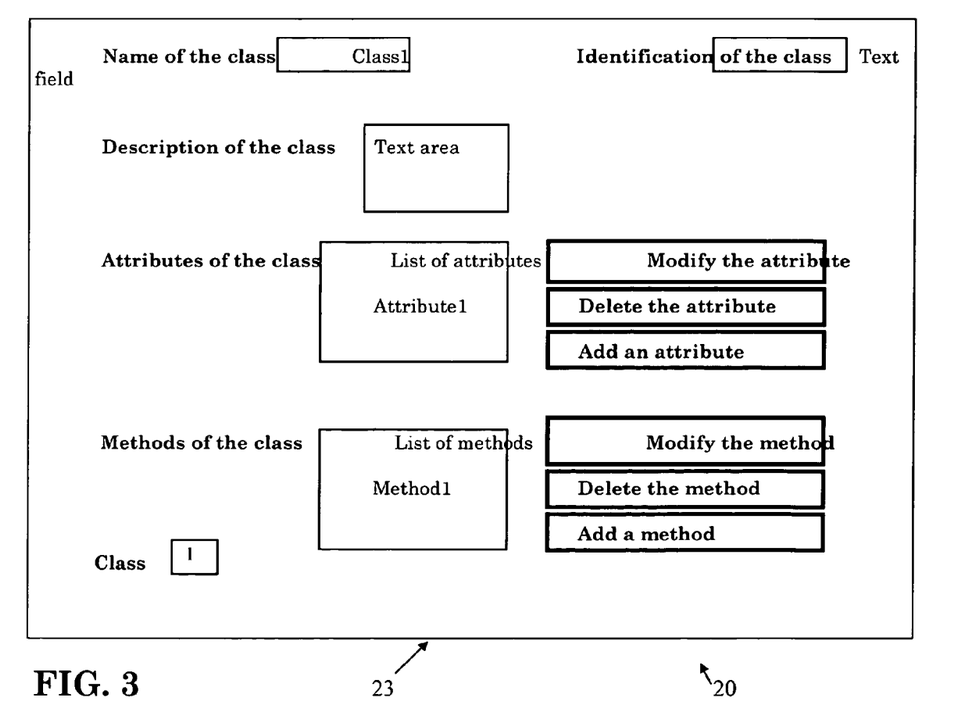
FIG. 3 is a dialog box used by the designer to dynamically create a class that suits the use of the system desired by the user.

FIG. 3 illustrates an example of a dialog box 23 that the tool 20 opens when the designer C clicks on the command "New class" in the "Classes" menu. The designer C uses the dialog box 23 to enter all of the data relative to a new class that does not inherit anything. It is understood that the data are the attributes and the methods of the new class.

The box 23 illustrated contains, for the entry of the data:
a text field "Name of the class"
a text field "Identification of the class (Class Id)"
a text area "Description of the class"
a list "Methods of the class" and
a list "Attributes of the class".

The box 23 also contains the six command buttons outlined in bold lines:
"Modify the method"
"Delete the method"
"Add a method"
"Modify the attribute"
"Delete the attribute" and
"Add an attribute".

When this dialog box is validated, it results in the creation of an instance of a global generic class called "GenericClass." The global generic class of the example illustrated in FIG. 3 has several attributes.

The first attribute is a name, formed by a character string designating the name of the class. It is written by filling in the field "Name of the class" in the box 23.

The second attribute is an identification of the class, formed by a character string that makes it possible to uniquely identify the class or the object in the system. This attribute is written by filling in the field "Identification of the class" in the box 23, for example indicating the date and time of creation, a random number forming a ticket, etc.

The third attribute is a description, formed by the text that describes the purpose of the class. It is written by filling in the area "Description of the class."

The fourth attribute is a table named "Attributes," which references the attributes of the class. The attributes of the class are themselves instances of a generic attribute class called "Generic Attribute," which has as attributes:
the name of the attribute
the description of the attribute
either the type of the attribute or the possible values of the attribute
the default value of the attribute, given at the creation of the class "GenericAttribute" and
the real value of the attribute, which is invisible to the designer C and is therefore not defined during the creation of the class. It is defined by the user U as described below.

For example, the class "Attributes[i]" is an instance of "Generic Attribute" and references the $i^{th}$ attribute of the class defined by the designer C.

Figure 4:
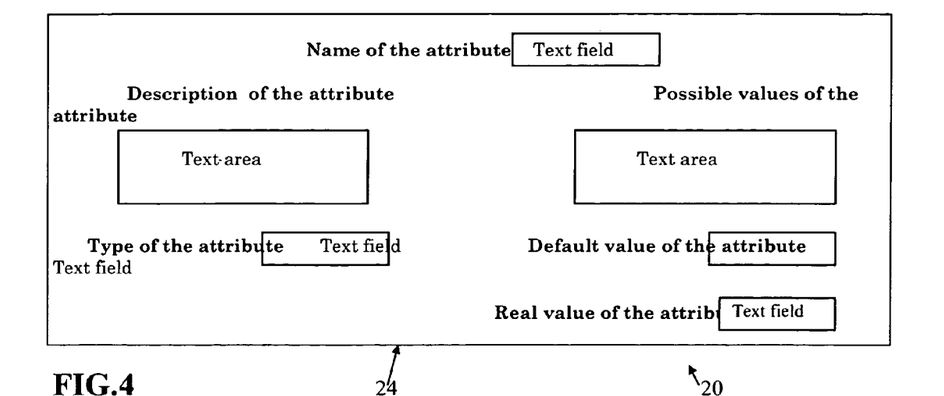
FIG. 4 is a dialog box used by the designer to define an attribute of the class presented in FIG. 3.

FIG. 4 illustrates a dialog box 24 of the tool 20 constituting the fourth attribute of "GenericClass." This box is opened from the box 23, for example by giving the name "Class1" to the class derived through the instantiation of the global generic class "GenericClass" and by activating the button "Add an attribute." The box 24 contains:
a text field "Name of the attribute"
a text area "Description of the attribute"
a text field "Type of the attribute"
a text area for "Possible values of the attribute"
a text field "Default value of the attribute" and
a text field "Real value of the attribute," shown in gray in FIG. 4 to indicate that it is not visible to the designer C.

Likewise, to modify an attribute, one need only select the attribute from the list of attributes in FIG. 3 and activate the button "Modify the attribute," in order to bring up the dialog box 24 of FIG. 4 and modify the data that appears in the box 24.

As the first attribute, the attribute is given the name "Attribute1" and the other fields are filled in. The validation of the dialog box 24 results in the creation of an instance of the generic class "GenericAttribute." The name "Attribute1" will appear in the list of attributes in FIG. 3, as indicated.

The fifth attribute of the generic class "GenericClass" is a table named "Methods," which references the methods of the class. These methods, in the example illustrated, are also instances of a generic method class called "GenericMethod." A method is defined by the following attributes:
its name
its description
its return type
its parameter, and
its execution script.

Figure 5:
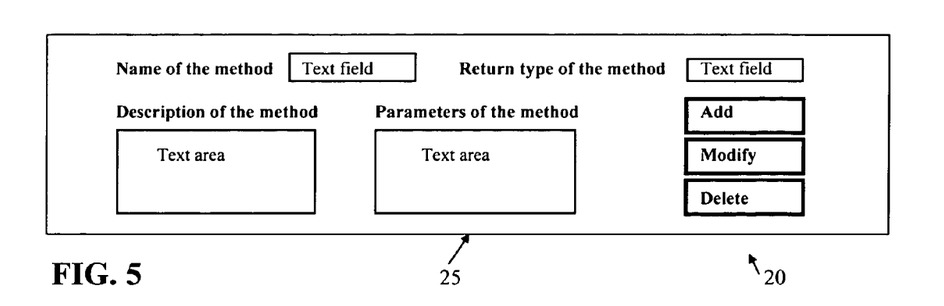
FIG. 5 is a dialog box used by the designer to define a method of the class presented in FIG. 3.

FIG. 5 illustrates a dialog box 25 of the tool 20 constituting the fifth attribute of "GenericClass." This box is opened from the box 23, for example by activating the button "Add a method." The box 25 contains:
a text field "Name of the method"
a text area "Description of the method"
a text field "Return type of the method"
a list of "Parameters of the method"
a command button "Add"
a command button "Modify," and
a command button "Delete."

As the first method, the method is given a name, for example "Method1," and the other fields are filled in. The validation of the dialog box 25 results in the creation of an instance of the generic class "GenericMethod." The name "Method1" will appear in the list of methods in FIG. 3, as indicated.

The generic class "GenericMethod" contains, in addition to the attributes of the method, a "Parameters" table that references the parameters of the method. The table may be empty if the generic class does not contain any parameter to be determined, or may not exist if this generic class is not intended to have any determinable parameter or if it has only fixed or predetermined parameters. In the table, the parameters are also instances of a generic class "GenericParameter." A parameter of a method is defined by the following attributes:

its name
its description
either its type or its possible values
its default value, and
its real value, not visible to the designer C.

For example, if the parameter relates to the number of pages to be printed, the default value will be 1, but the user U could indicate another real value, for example 3 in order to have three copies of the pages to be printed.

Figure 6:
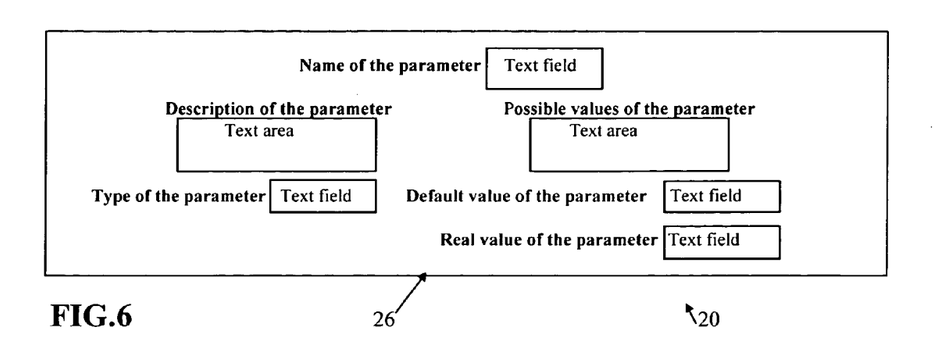
FIG. 6 is a dialog box used by the designer to define a parameter of a method defined in FIG. 5.

FIG. 6 illustrates a dialog box 26 of the tool 20 for filling in the parameter table of "GenericMethod" in FIG. 5. The box 26 is opened from the box 25 by activating the button "Add." The box 26 contains:

a text field "Name of the parameter"
a text area "Description of the parameter"
a text field "Type of the parameter"
a text area "Possible values of the parameter"
a text field "Default value of the parameter," and
a text field "Real value of the parameter," represented in gray in FIG. 5 to indicate that this field is not visible to the designer C.

As a first parameter, it is given for example the name "Param1" and the other fields are filled in. The validation of the dialog box 26 results in the creation of an instance of the generic class "GenericParameter." The name "Param1" will appear in the list of parameters in FIG. 5.

The dialog box 23 of FIG. 3 being filled, the class "Class1" is created dynamically. It can be validated by being saved with the command "Save the class" or "Save the class as . . . ".

Figure 7:
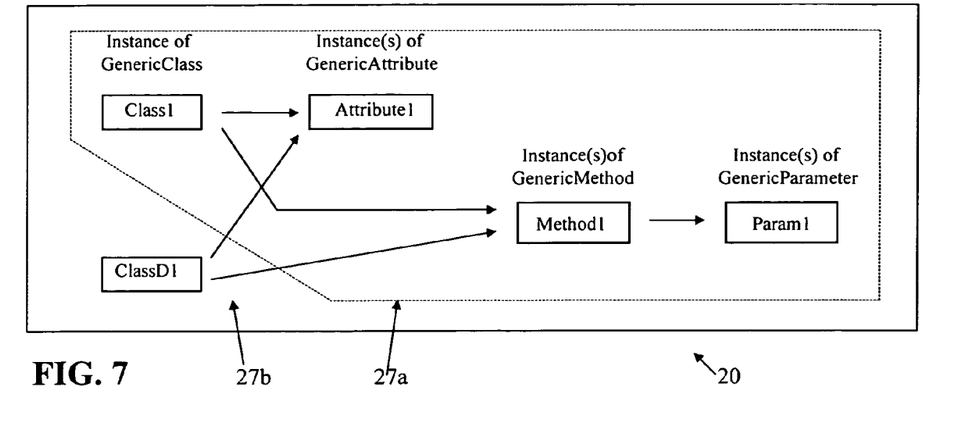
FIG. 7 is a block diagram of the tree structure of the class as defined by means of the dialog boxes presented in FIGS. 3 through 6.

FIG. 7 illustrates the tree structure 27a of the class "Class1" resulting from the validation of the box 23. In FIG. 7, the class "Class1" is an instance of the global generic class "GenericClass" and has an attribute "Attribute1" and a method "Method1," itself having a parameter "Param1," all three of which are instances of three respective generic classes. Of course, another class that is an instance of the global generic class "GenericClass" could have several instances of each of the three generic classes "GenericAttribute," "GenericMethod" and "GenericParameter." This tree makes it possible to dynamically modify, add and delete members of the class (attributes or methods) at any time.

It is known that an object is an instance of a class. The activation of the command "New class object" in the "Objects" menu in the window 21 of FIG. 2 displays on the console 17 of the designer C a dialog box (not illustrated) that contains the list of all the classes already defined. The designer C can select one of these, which will be the class of the new object. Within an object, values can be given to the attributes. These values will represent its identity and its state.

Furthermore, the global generic class "GenericClass" as it appears in FIG. 3 preferably has an additional attribute consisting in a boolean 0" or "1," which indicates whether the instance of the current generic class represents a class or an object. In the example illustrated, the boolean is "1" to indicate that the designer is creating a class. The boolean is automatically set to the corresponding value in response to the command "New class" or "New class object" that has been activated by the designer C in the window 22 of FIG. 2. In the example chosen, this attribute is not visible to the designer C and is therefore shown in gray.

Also, in the window 21 of FIG. 2, the "Search" menu is very useful to the designer C for performing a powerful search in the base 15 to find classes and objects created in accordance with a list of criteria that he defines. The designer C can, for example, create a new class through inheritance from a class he has found, instead of starting from zero and redoing a job that has already been done.

More generally, the dialog boxes 23–26 are used by the designer, respectively, to generate the global generic class and the generic classes that can compose it. Although the dialog boxes illustrated completely define these classes, not all of the attributes, types, text fields and areas illustrated are necessary. In particular, the descriptions are illustrated for purposes other than the method for automatically generating classes that has just been described.

The description will now refer to the tool 30 for deriving a class or an object, the tool 30 being contained in the module 13 of the command interface 11 of FIG. 1.

Inheritance with the command "New inherited class," instantiation with the command "New class object" and cloning with the command "Clone an object" all require the dynamic creation of a copy of the class (for inheritance or instantiation) or a copy of the object (for cloning).

FIG. 7 also illustrates a tree 27b of a class "ClassD1" obtained by duplicating "Class1." This figure illustrates, in a general way, that the duplication of the instance of "GenericClass" is not enough, since the duplicated class "ClassD1" will point to the same instances "GenericMethod" and "GenericAttribute" as the instance "Class1" of "GenericClass." For example, it is clear from FIG. 7 that "Attribute1" is common to both classes, while the two classes must be distinct and independent. Consequently, in order to derive a class or an object, i.e., in order to create a new class through inheritance, instantiate a class or clone an object, it is necessary not only to duplicate the instance of "GenericClass," but also to duplicate each instance directly or indirectly referenced by the instance of "GenericClass."

Furthermore, software developers use a serialization technique that is applied to many languages, such as Java or C++. Serialization makes it possible to store any object on a data recording medium, a disk for example. If for example a first object references objects, which themselves reference other objects and so on, one need only write the first object onto the disk with the serialization method in order to automatically store in memory the tree of all the objects directly or indirectly referenced by the first object.

Figure 8:
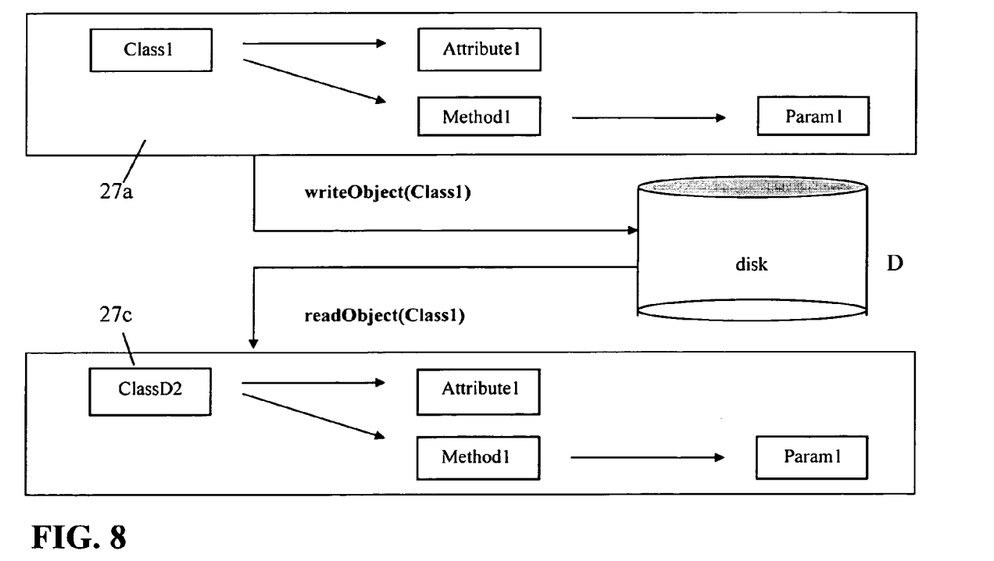
FIG. 8 is a block diagram illustrating a method for the derivation of the class presented in FIG. 7.

FIG. 8 schematically illustrates the principle of the method for deriving a class "Class1" or an object. The tool 30 implements this method. The example illustrated refers to the creation of a class "ClassD2" by inheritance from the class "Class1" as illustrated in FIG. 7, it being understood that the method can be applied in the same way to the instantiation of a class or the cloning of an object. As indicated in FIG. 8, the derivation method consists, in a first step, of serializing the class "Class1" by copying it onto a disk D, for example the hard disk of a machine 2a or 2b of the computer infrastructure 1 of FIG. 1. Thus, the entire tree 27a of this class, as illustrated in FIG. 7, will be duplicated and stored on the disk. The second step consists of reading the duplicated class stored in the disk D, by loading it into the tool 30, i.e., into the RAM in which the program of the tool is loaded. Thus, the duplicated class "ClassD2" has a tree 27c identical to that of the tree 27a of the mother class "Class1" but is independent of the mother class. In Java language for example, the two steps of the method can be executed for example by the following two instructions:

FileStream.writeObject(Class1);
// for serializing the source tree Class1;
New object or New class=FileStream.readObject( );
//to have a copy of Class1

Figure 9:
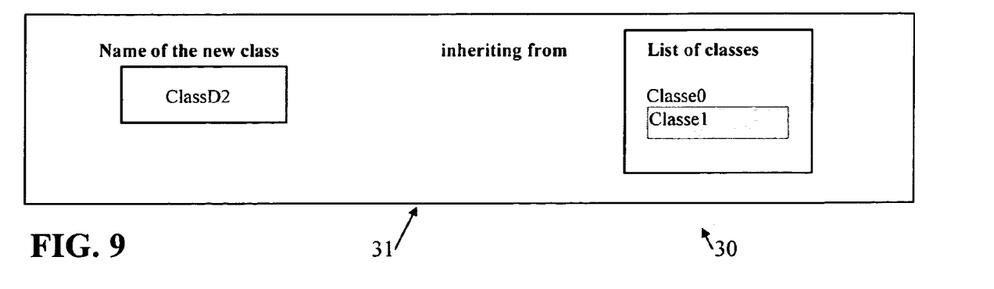
FIGS. 9 and 10 are dialog boxes used by the designer to define the class derived by using the method illustrated in FIG. 8.

FIG. 9 illustrates a dialog box 31 for the utilization of the tool 30. This example is similar to that of FIG. 8, which relates to the creation of a class inheriting from another class. Upon execution of the command "New inherited class" from the "Classes" menu of FIG. 3, the dialog box 31 of FIG. 9 appears. This box contains a text area "Name of the new class" and a list of the classes from which the mother class can be chosen. In the example chosen, the class "Class1" is chosen from the list, as indicated in gray in FIG. 9. In the preceding example, the inherited class is named "classD2."

Figure 10:
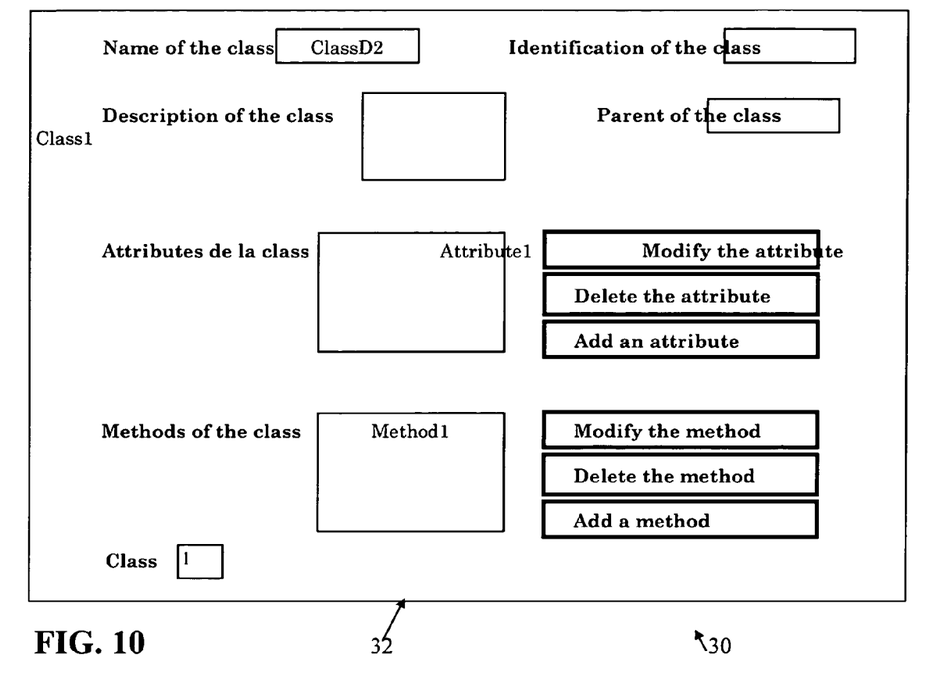

FIG. 10 illustrates an example of a dialog box 32 resulting from the validation of the box 31. The box 32 is similar to the box 23 of FIG. 3. Consequently, only the differences will be indicated below. The data contained in the box 32 is automatically filled in by the software of the tool 30. The name of the class is the one indicated by the designer C in the box 31 of FIG. 9. The box 32 also contains a table indicating the parent or parents of the class, in this case "Class1," which the designer C has selected from the list in the box 31. The other data is similar to that of the box 23, since the tree 27c of the daughter class "ClassD2" is the same as the tree 27a of the mother class "Class1." Using the command buttons in the box 32, it is possible to have only the new class "ClassD2" evolve, independently from the mother class "Class1."

The global generic class "GenericClass" therefore has an additional attribute named "parent," which is a table containing instances of the global generic class, such as Class1. The table makes it possible to know the provenance of the current instance, in the following way:

(a) If the current instance is an object, then:
  if in general "parent[0]" (indicated for example in the table to which the current instance refers) is an object, the current object has been cloned from parent[0],
  if "parent[0]" is a class, the current object is an instance of parent[0],
(b) If the current instance is a class, then "parent[0]" is either empty, which means that the class has been created without inheritance with the command "New class,"
  or a class (and not an object), which means that the current class has inherited from "parent[0]" through the command "New inherited class."
(c) With the result, by iteration, that the table "parent" indicates all the ascendants of the current instance.

The method is clearly shown in FIGS. 8, 9 and 10. In response to the first instruction indicated in FIG. 8, "Class1" is serialized by being copied onto the disk D. In response to the second instruction, the class thus serialized is again saved in memory, but with modifications of attributes, specifically the class name "ClassD2" and the table "Parent." The two trees 27a and 27c are therefore the same, but they are separate from one another. For example, even though they have the same two instances "Attribute1," in reality these two instances are completely separate from one another in memory and can exist independently from one another. In particular, they can be modified differently from one another at any time. This example also makes it clear that the same is true for the other two commands "New class object" and "Clone an object."

More generally, it is clear from the preceding description that the method for deriving an object class and/or an object having a given name consists of making a copy of the entire tree of the class or the object, saving the copy of the tree and changing said name in order to assign a name to the saved copy. We have seen that the copy is preferably made through a serialization of the tree representing said class or said object by copying the tree into a memory D, and the saving of the copy of the tree consists of copying it again into a memory 30. Furthermore, we have also seen that the serialization, which can be done in various languages, is particularly simple to implement in Java® language.

The function of the interface generator 14 will now be described. Up to this point, we have seen how the designer C can easily create object classes and objects that meet the needs of the user U. The classes and objects thus created are stored in the interface base 15. However, these classes and objects are still incomprehensible and unusable for the user U. Preferably, the user U is also prevented from accessing them, so that the designer can be assured of their integrity. The function of the generator 14 is to transform the classes and objects thus created into interfaces in the form of documents in which the commands that meet the needs expressed by the user U are understandable to him. In order to distinguish these interfaces from the other interfaces involved in this description, they will be called document interfaces. The language used in these document interfaces can be the current language and/or a specialized language in the user's field of expertise.

The operation of the generator 14 will be explained in the following example, which refers to and elaborates on the preceding example in which the company is a bank branch, the user U is the manager of the branch and the designer C is a computer expert of the bank. It is assumed that the manager U wants to (1) consult the bank's computer infrastructure to query the databases in order to obtain a list of his clients of a given type, students in the example in question, and (2) to print personalized letters of several types, such as information letters, invitation letters, and reminder letters. The computer expert C translates the operation desired by the manager into two questions. In this case, the computer expert creates in response two object classes, "consult_system" and "print," using the two tools 20 and 30. He can create each of these two classes directly by activating the command "New class" in the window 22 of FIG. 2, or indirectly through derivation from a similar class. In the latter case, the designer C can activate the "Search" command in the window 22 to find a similar class. If a similar class exists, he selects it from the list of classes and can derive it, for example by activating the command "New inherited class" of FIG. 2 and by modifying, adding or deleting attributes and/or methods.

The generator 14 implements a process for generating a document interface for the control of a computer system by a user, the command being created from at least one object that includes descriptions. The process consists of extracting at least some of said descriptions from the object and of organizing them so as to translate the meaning of said command into a language understandable to the user and thus create from said interface a document interface. The generator 14 therefore comprises an extraction block 14a and a generation block 14b. The extraction block 14a takes the object selected by the designer from the interface base 15 and extracts the descriptions from it. The generation block 14b organizes the descriptions to create the document interface and stores it in the interface base 15.

The method will be better understood from the preceding example. Among the attributes of the class "consult_system" of the example in question are methods that use specific commands to operate on the data of the system, in this case in the databases of the system 10. From these methods, the designer C creates a method "list_students" in order to have the description "List of all students having . . . ". The engineer assigns to the method "list_students" a return code of the "list" type having the description "list of the names and addresses." He also assigns to this method, using the dialog boxes 25 and 26 illustrated in FIGS. 5 and 6, the three parameters defined in Table A below.

TABLE A

| name | Description | type | default value |
|---|---|---|---|
| "age<" | "an age less than" | Integer | 26 |
| "place of study" | ", studying in" | Paris, Versailles | Paris |
| "loan>" | "and having taken out a loan of more than" | Integer | 6,000 francs |

For the class "print," the engineer C creates a method "print_invitation" in order to have a description such as "Print letters to:" and assigns this method a return code of the "void" type, indicating that the method does not return a value, and two parameters as defined in Table B below.

TABLE B

| name | description | type | default value |
|---|---|---|---|
| "addressee" | "Print letters to" | list | list_students of consult_system information |
| "type of letter" | "type of letter:" | birthday invitation; reminder; information on the student loan | |

These tables indicate how to fill in the dialog boxes 25 and 26 of FIGS. 5 and 6 so as to constitute the two classes "consult_system" and "print" using the dialog box 23 of FIG. 3. More generally the document interface of an object is created from descriptions corresponding to this object, its attributes, its methods and the parameters of the methods.

To create a document interface, the designer activates the menu "Export to U" in the window 22 of FIG. 2. This command calls the generator 14 for generating a document interface from the selected object. The generator 14 extracts the descriptions of the object and organizes them to create the document interface.

Figure 11:
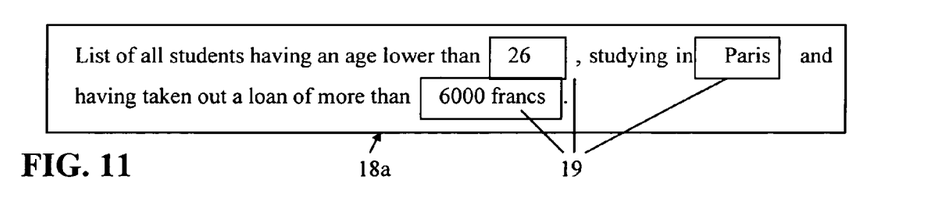
FIGS. 11 and 12 illustrate two respective interfaces resulting from the implementation of the method of the invention.

FIG. 11 illustrates the document interface 18a of the method "list_students." It shows that the document interface 18a has been obtained by extracting descriptions from the method and its parameters, as defined in Table A. In particular, the values "26," "Paris," and "6,000 francs" are the default values indicated in Table A. Generally, a document interface 18 comprises text and at least one possible field 19 whose initial content is made of default values and can be modified by the user U.

Figure 12:
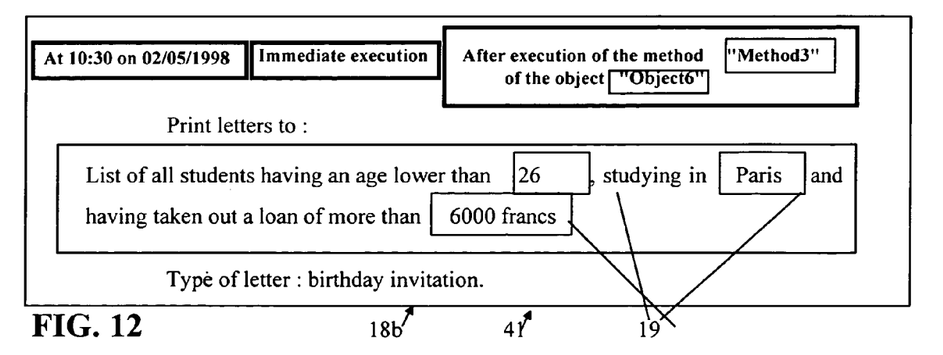

FIG. 12 illustrates an example of a document interface 18b of the method "print_invitation" of the class "print" defined previously. The examples of FIGS. 11 and 12 are enough to allow one skilled in the art to know how to construct a document interface related to an entire object.

Generally, when the object contains all the descriptions, they are preferably organized by the generator 14 in the following order:

1. the description of the object (not illustrated), for example "print";
2. the description of each attribute (not illustrated), for example the number of the printer, the print quality, the color of the ink, the printing paper; this description is followed by a field that corresponds to its value; if the attribute has a limited number of values, this field is a list containing all the possible values and allowing only the selected value to appear;
3. the description of each method (see Tables A and B, FIGS. 11 and 12 and the text related to them), this description being attached to and preferably followed by:
    3.1 the description of its return value, attached to or followed by a field that represents this value, and
    3.2 the description of each of its parameters, attached to or followed by a field (19) representing the value of the parameter;
4. a control means (see FIG. 12) indicating when the method should be executed, which execution can be immediate or deferred, or can occur at a moment determined by a date and a time, or as a result of another defined method.
    4.1 In the first case, a command button is labelled "Immediate execution"
    4.2 In the second case, a command button includes a label with a value "at" (for example—print "at"—) followed by a "time" field and a "date" field linked to a calendar of openable days of the year;
    4.3 In the third case, a command button includes a label entitled "after the end of execution of" followed by a field that makes it possible to choose a method of any object and that means the method will be executed after the end of the execution of the selected method.

The designer C has the capability to change the presentation of the page, add or remove fields, select the descriptions to be included, and modify the texts of descriptions and types to make the document easier to understand. It follows that the same object can generate several document interfaces adapted to specific needs offered in the object. For example, we have seen above that the object "print" can have a large number of attributes and methods, offering a wide choice of document interfaces as a function of the attributes and methods adapted to needs. It is of course recommended that the designer C create the document interfaces 18 with the help of the user U.

The description will now refer to the command module 12 used by the user U to obtain the document interfaces 18 from the base 15. The module 12 contains a block 40 for generating documents 41 created from document interfaces stored in the base 15. The block 40 is therefore connected to the base 15 in order to take the document interfaces 18 from it and determine which command documents 41 are adapted to the particular needs of the user U. For example, assuming that the user needs the document "print," an interface that includes the method illustrated in FIG. 12 will be presented to the user, who can modify the values of the fields 19 and select the execution command buttons to create a document 41. The document 41 illustrated in FIG. 12 corresponds to the document interface 18, in which the values of the fields 19 have remained unchanged by the user and the execution button has been deferred to a predetermined time has been activated (in gray in FIG. 12).

Figure 13:
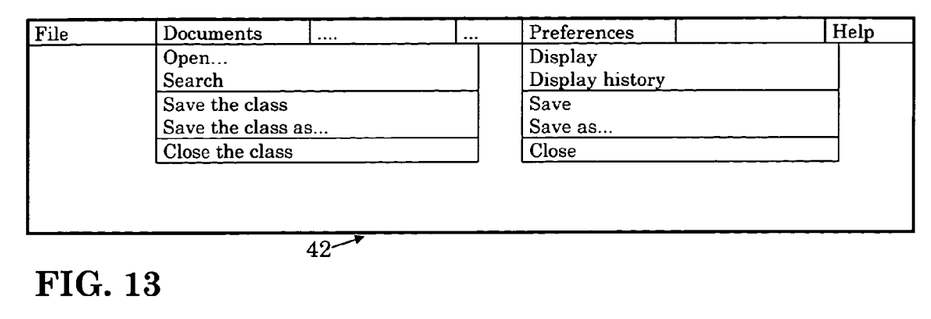
FIG. 13 is a window presented to the user for the utilization of the interfaces illustrated in FIGS. 1, 11 and 12.

FIG. 13 illustrates an example of a dialog box 42 presented to the user U by the user module 12. The menu bar of the box 42 contains, in particular, two main menus, "Documents" and "Preferences." In the "Documents" menu, there is the "Search" command for finding document interfaces, for example from descriptions of the corresponding objects, and the "Open" command for listing document interfaces by the names of their corresponding objects and selecting an object name from them. A selected object is displayed with the description of the object. From this interface, the user creates the desired document. In the "Documents" menu, there are also of course the commands for saving (Save and Save as . . . ) and for closing the document.

The "Preferences" menu contains, in particular, two commands, "Display" and "Display history." The "Display" command displays all of the documents created by the user in the order of execution of the commands he has chosen. This set defines the user's preference. He also has a global view of the methods he has activated from several documents. He can validate it or modify it. For example, clicking twice on a chosen method causes the opening of the corresponding document for possible modifications. The command "Display history" presents all the methods that have been executed by the user, the end of execution status, and the time. The menu also contains the save and close commands.

Generally, the preceding description relates to a method for generating an interface 18 for the control of a computer system 10 by a user U, the command being created from at least one object that includes descriptions of the object and/or at least one member of the object, the method consisting of extracting at least some of said descriptions from the object and of organizing them so as to translate the meaning of said command into a language understandable to the user, and thus create from said interface a document interface.

The tool allows the designer C to easily adapt the text of the extracted descriptions, so that their organization makes the text of the interface understandable. To make the method more flexible, the designer can select the descriptions to be extracted.

Preferably, since the descriptions include at least one description of a method of the object, the method of the invention consists of attaching to this description a description of its return code and/or a description of at least one respective parameter of the method and a value 19 of the parameter, which value can be modifiable. Also in this case, as in the example illustrated, the method can advantageously consist of adding to the interface 18 a means for the control by the user of the moment of execution of said interface.

In the example described, the text of the descriptions used to create the interface is written by a designer using the system, in response to needs that are submitted to him by the user. This cooperation between the designer and the user makes the method very flexible, highly evolutive, and very high-performance. However, it is clear that this condition is not necessary, the tool being for example adapted to a given field of expertise or a given company function.

Finally, we have seen the advantage that the user can gain from the capability offered in the example described to select interfaces and define the chronological order of their execution, and to have the selected interfaces presented to him in a window, arranged in this order.

The design module 13 also has a tool 50 for controlling similar functions in different operating systems and/or applications and a tool for automatically generating code 60 for implementing the interface tool 50. The computer system 10 represented in FIG. 1 will be considered to be a highly heterogeneous system, representing a case that is difficult to handle. In the example in question, the two operating systems 4a and 4b are two different versions of the UNIX operating system, known by the names Berkeley UNIX and AT&T UNIX. The two machines 2 are also assumed to include in the their respective memories 3 two printing software products that are different from one another 6a and 6b, such as the software products known by their registered trade names DPF, OpenSpool and XPRINT.

It is assumed that the two operating systems 4a, 4b and the two printing software products 6a, 6b have at least one common functionality F. However, since the software products 4a, 4b, 6a, 6b can be very different from one another, this functionality F can be executable by commands that are very different from one software product to another.

Several functionalities can be common to all or some of the software installed, such as the printing of documents and the saving of documents. The description will refer to the printing of documents as an example of the functionality F. This functionality can comprise several functions f, for example the functions: f1 "print"; f2 "list the current print jobs"; f3 "display the queues"; f4 purge the print jobs"; and f5 "change the priority of a print job in a queue." Hence, in this case, a functionality F is a family of functions f. The following example relates to the function f1 and will be enough to allow one skilled in the art to understand the invention overall.

It is assumed that the "print" function f1 in the four software products 4a, 4b, 6a and 6b in the computer system 10 of FIG. 1 is formed of four respective different specific commands: Pa and Pb for the respective operating systems 4a an 4b, and Pc and Pd for the printing software 6a and 6b. In the example of the software in question, the two different versions 4a and 4b of the UNIX operating system have respective print commands Pa=lpr" and Pb=lp.: However, it could also have print commands such as "enq" for the operating system known by the registered trade name AIX; "print" for the DOS operating system for personal computers; "mp" for the print software DPF OpenSpool; and "xpad" for the printing software known by the registered trade name XPRINT.

Each specific command Pa–Pd comprises options, possibly associated with respective specific types. Table C below illustrates an example of an inventory involving only the print commands "lpr" and "lp" of the operating systems 4a and 4b. This example will be enough to allow one skilled in the art to understand the invention.

TABLE C

| Options of "lpr" | followed by | Options of "lp" | followed by | options - comments |
|---|---|---|---|---|
| –P | string | –d | string | destination of the print job |
| –T | string | –t | string | title of the document |
| –# | num | –n | num | number of copies |
| does not exist | | –w | | writing of a message in C's terminal at end of print job |
| –r | | does not exist | | destruction of the file when the print job starts |

The command tool 50 is a software tool whose main object is to offer a user who is a computer expert, the designer C in FIG. 1, a common command P0 for the execution of each of the different print commands Pa–Pd in the example illustrated. As indicated in FIG. 1, the tool 50 illustrated comprises a block 51 for defining the common command P0, and two print drivers 52a, 52b for the two respective machines 2a and 2b, the drivers reacting to the common command P0 for generating the command Pa or Pc in the machine 2a and Pb or Pd in the machine 2b. In the example illustrated, the two drivers 52a and 52b are installed in the two memories 3 of the two machines 2, while the block 51 is incorporated into the design module 13. The definition block 51 is connected to both drivers.

The command tool 50 implements the method for controlling a function f executable by means of different commands Pa–Pd in respective software products 4a, 4b, 6a, 6b, the commands each being capable of having at least one option. The method consists of defining in an abstract class an abstract method for the function f, the abstract method including parameters corresponding to the union, in the logical sense, of all the options (Table C) of the specific commands, of defining a common command (P0) that includes the arbitrary symbols corresponding to the parameters of the abstract method, of creating at least one driver (52) for implementing the abstract method in a machine, and of having the driver execute one of the specific commands with options equivalent to the options of the common command.

Let us assume that the user U wants to execute the command: print two copies, with a printer called printer 1 of the computer system 10, of the file called myfile, indicating in a header the name of the file, and destroy the file once printed. This command, in the software 4a and 4b, is written in the following way, taking into account Table C:

lpr -Pprinter1 -#2 -r myfile lp -dprinter1 -n2 myfile for which it should be noted that in Table C the deletion of the file is not provided for the command "lp."

According to the above method, an abstract method is created for the function f. While a general method comprises a header and a body, an abstract method has only a header, so it is not executable and therefore the corresponding class cannot be instantiated. In the example of the function f1 "print", an abstract method is therefore created, which will be called by the same name, "print." This method includes parameters that respectively correspond to the options of the specific commands Pa–Pd, the number of parameters corresponding to the number formed by the union, in the logical sense (assembler), of all the options of the commands. Thus, in the example of the "print" function, and illustrating the examples in the Java® language, it follows from Table C that the abstract method "print" is defined by the following six parameters.

```
public static int print
    ( String destination,
      String title,
      int numberOfCopies,
      boolean message,
      boolean destruction,
      String nameOfFile,
    ) ;
```

Of the six parameters above, the first five correspond to the five options defined in Table C and the last parameter designates the name of the file that is placed at the end of the print commands "lpr" and "lp."

An abstract class, in the object-oriented sense, contains at least one abstract method, in this case the abstract method "print" defined for all of the similar commands Pa–Pd of the given function f1. The abstract class can be any class. Preferably, in the example in question, the abstract class corresponds to the functionality F, and in the example illustrated, has the same name, "print." Therefore, the abstract class "print" has as its methods only the abstract methods that relate to the functions f1–f5 of the functionality F. The class "print" corresponds to an interface, as defined for example in the Java® language. Such an interface is defined as the most abstract class that can be constructed, i.e., a class wherein each method is abstract.

We have seen that the method implemented by the tool 50 also consists of defining a common command P0 that includes arbitrary symbols corresponding to the parameters of the abstract method. For example, the common command P0 has the following syntax:

print [-dDestination] [-tTitle] [-nNumber] [-m] [-D]-ffile having the arbitrary symbols -d, -t, -n, -m, -D and -f. These symbols may or may not be associated with options, the latter being placed between brackets, so that only the term "file" is not an option, as indicated above. The absence of an option means that the symbol corresponds to a boolean type.

The method as defined above also consists of constructing the drivers 52a and 52b for generating the commands Pa and Pb ("lpr" and "lp") in the two respective machines 2a and 2b. A driver, in the object-oriented technology sense, implements the "print" interface, which means that a driver defines a body with each method of the interface, so that the abstract class can generate an executable class. The body thus defined makes it possible to construct the options of the corresponding command ("lpr" for example) with the parameters of the method and to activate this command.

The following example illustrates how to create the driver 52a related to the command "lpr" and clearly shows one skilled in the art how other drivers can be created. The driver 52a is a class that makes it possible to implement the print interface in the following way:

```
public class Driver__lpr implements Print
{   public static int print
    (   String destination,
        String title,
        int numberOfCopies,
        boolean message,
        boolean destruction,
        String nameOfFile
    )
    {// 1)  building the arguments of lpr from parameters.
     //  2)  activating the command lpr with its arguments.
     //  3)  retrieving the return code and messages from
              lpr and processing them.
    }
    public static void main (String argv [ ])
    {//  the first main argument is the name of the
     //  method to be executed, the others are the arguments
     //  of this method.
     //  As a function of the name of the method, the main
     //  arguments are transformed into the type of the
     //  parameters of the method, which is then called
    }
}
```

More generally, other driver possibilities exist, for example one or both drivers could also be installed in the command interface 11, or only one driver could be enough, advantageously installed in the command interface 11. Likewise only one driver could be provided for a system having only one machine, the driver being used to generate the various commands of the software installed in this machine.

Finally, the process defined above consists of having the driver execute one of the specific commands, for example "lpr," with options equivalent to the options of the common command.

The equivalence between the options of the command "lpr" and the options of the common command P0 can be produced in various ways. The preferred way, which will be illustrated, consists of creating a configuration file that defines the types and the default values of the options of each specific command that can be executed by the driver. In the present example, the specific command is "lpr", which is executed by the driver 52*a*. Preferably, the configuration file also comprises the type of each option and/or possible comments and/or the name of the driver.

The configuration file is preferably created prior to the construction, and advantageously during the installation, of the driver. In the example chosen, the configuration file provided by the driver is called "ConfigPrint." Any other name can be given to it, but it is important that this name be the same for all the drivers of the same function f of the commands Pa–Pd in question, and that it be accessible to all of these drivers, preferably by being installed in the same directory.

The configuration file in our example is:

NameOfDriver=Driver_lpr

OPTION=-d TYPE=string DEFAULT=null

// the type of the value associated with the option -d is a // character string

OPTION=-t TYPE=string DEFAULT=null

// the type of the value associated with the option -t is a // character string

OPTION=-n TYPE=num DEFAULT=1

// the type of the value associated with the option -n is a whole

//number

OPTION=-D TYPE=none

//there is no value associated with the option -D

OPTION=-f TYPE=spring REQUIRED

//the option -f must be present in the command line

//The option -m does not exist for this driver

The symbols used in the common command P0 are found in the configuration file.

The equivalence between the options of the common command and the specific command also consists of determining the parameters of the specific command by consulting the configuration file by means of the common command. Thus, the common command P0 reads the configuration file in order to verify that the options of the syntax of the common command are actually compatible with those of the driver installed. In other words, the common command P0 determines whether the options provided by the designer C are legal. If so, it is completed with all of the options not provided and it calls the driver for executing the specific command. If not, an error message is sent with a description of the legal options. Furthermore, it verifies that any values attached to the options have actually been assigned. If the value due to an option does not exist, it is determined from its description (default value) in the configuration file.

Given that the print command "lpr" as defined above is lpr -Pprinter1 -#2 -r myfile then the corresponding common command P0 is:

print -n2 -dprinter1 -D -fmyfile

The common command P0 then calls the driver 52*a* related to the command "lpr" in the following way:

java DriverLpr print Printer1 null 2 false true myfile.

// false indicates that the option -m is not set

// true indicates that the option -D is set

// null indicates that the option -t is not filled in

This command results in the calling of the "main" method of the driver 52*a*, which in turn triggers the calling of the "print" method in the following way:

print (<<Printer1>>, null, 2, false, true, <<myfile>>);

The "print" method thus activates the commands "lpr" in the form:

lpr -Pprinter1 -#2 -r myfile

Up to this point, we have described the function of an application driver. We have seen that a driver is a class used to implement an abstract method of an abstract class. The driver is defined by data written by the designer C with the aid of the tool 20 or 30 of the design module 13. The code lines of this software must normally be completely written by the designer C. A large part of this work is very laborious and therefore time-consuming and expensive. However, automatic generation poses two problems. The first problem is translating the driver into an object-oriented language. The second problem is automatically generating a body for the abstract method. We have seen that the body of the abstract method must include the specific data of the specific command to be executed, and a driver may be used to execute several specific commands. This can no longer be done by means of the tools 20 and 30 and requires manual operations by the designer C. The difficulties caused by these two problems induce the designer to write the drivers.

The computer system 10 of the invention includes a tool 60 for automatically generating, in an object-oriented language, a driver 52 for implementing an abstract method of an abstract class for the execution of a specific command Pa–Pd having specific data (Table C), the abstract method having a return value and at least one parameter provided with a type. The object-oriented language chosen in the following example is the Java® language. The tool 60 for automatically generating a driver that will now be described is contained in the design module 13, although it could also be included in the computer system.

The process implemented by the tool 60 consists of defining the class of the driver through defining data and by making said return value and said type of said parameter correspond to corresponding types in said language, of translating the defining data of the driver into said language, of generating the body of the abstract method by constructing a skeleton to be completed by the designer C with the specific data of the specific command.

For the definition of the driver, the designer C preferably uses the tool 20 or 30. For example, he can use a blank state of the box of FIG. 3 to indicate the name of the class, add at least one attribute using the box of FIG. 4, and at least one method and at least one parameter with the boxes of FIGS. 5 and 6. However, in order to perform an automatic generation, the tool 60 requires a correspondence between the types of the parameters and of the return value of the method and the types in the language chosen, in this case the Java® language. Without this correspondence, the designer must write the software of the driver manually. The correspondence chosen as an example translates into the following rule in Java® language:

"Any type defined by the designer C must belong to the following set (T):

{Boolean, Character, Double, Float, Integer, Long, String, Void} or

List(x)

with x belonging to (T)."

The set T can be extended to List (List(x)) successively in order to represent tables with several dimensions. Generally, the set T is a table that can be multidimensional. It is clear that this set (T) could be replaced by another set with which it is in bijection. For example, in France the type defined by Character in English is replaced by Caractère.

Each element of the set T corresponds to a predefined class of the same name in Java language, except List and Void, which respectively correspond to the class Vector and to the reserved word void in Java®. In other words, the types of the set T preferably included predefined classes with the same name in the language.

Figure 14:
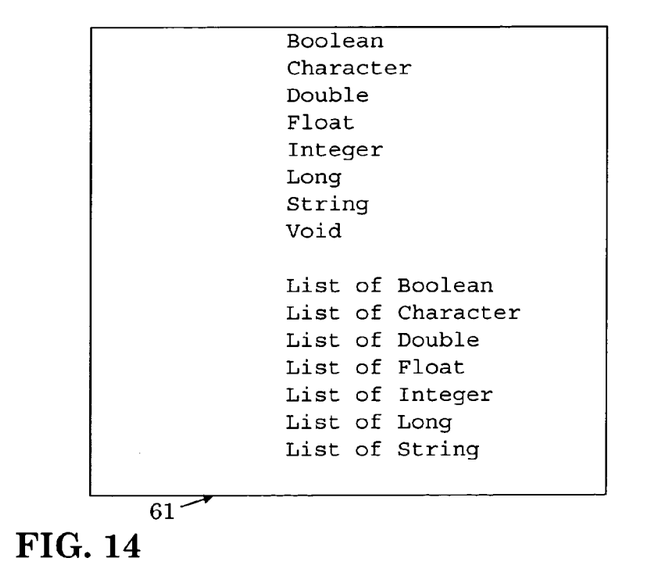
FIG. 14 is a dialog box used by the designer to automatically generate, in an object-oriented langage, a driver for implementing an abstract method in an abstract class for the execution of a specific command in the system of FIG. 1.

FIG. 14 illustrates a dialog box 61 that is opened to define the parameter types and the return value of the method. If for example the designer wants to define a method labelled "copy" that does not return a value and that has the following two parameters:

1) "name of file" (String type), which is the URL (Uniform Resource Locator) address of the file, and
2) "directory" (String type), which is the URL address of the directory into which he wants to copy the file, he enters the name "copy" in the text field defining the name of the method in the box 25 of FIG. 5, selects in the box 61 the type void in order to insert it into the text field related to the return type of the method, and activates the control button "Add" to define a new parameter using the box 26 of FIG. 6. In the box 26, he indicates the name of the first parameter "name of file" and selects in the box 61 the type String, which has just been placed in the text field related to the parameter type. The designer preferably adds, in the text area related to the description of the parameter, the text, for example "URL address of the file." The same is done for the second parameter.

The abstract method "copy" is therefore written:

public void copy (String name_of_file, String directory);

Let us assume that the name of the corresponding abstract class, an interface in the Java® sense in the example illustrated, is named "operations on the file."

We have seen that another step of the method consists of translating the defining data of the driver into the chosen language. The translation can be done according to the following example. The name of the interface is the name of the class defined by the designer C, preceded by the two characters "I_". If the name of this class contains the blank character which is forbidden in standard languages like Java or C, it is replaced with "_". The same rule is applied for the class of the driver, but by replacing "I_" with "P_". If a number n of drivers is generated, it is necessary to follow the names of the drivers with the two characters "_i", where i varies from 1 to n. If the names include accented letters, it is also possible to suppress the accents in order to comply with ordinary Java language. Thus, the class is written in the following way:

```
interface I_operations-on_file
{
public void copy (String name_of_file, String directory);
}
``` and the corresponding driver is written in the following way:

```
class P_operations-on_file_1 implements I_operations_on_file
{
public void copy (String name_of_file, String directory);
    {
    ...
    }
    public static void main (String argv[ ])
    {...}
}
``` where the content { . . . } related to the method "copy" constitutes the body of the method, which corresponds to the specific command to be executed, and main is the main method that will be called by the unified command P0, which in turn triggers the execution of the method "copy" for executing the specific method "lpr." It should be noted here that the driver can be executed in several ways known to one skilled in the art The exemplary execution chosen consists of incorporating the driver into the main method main.

If for example the class "print" previously defined by the designer C contains an attribute "number of copies" of the Integer type having the default value "1," the class of the driver in Java® language has the attribute:

Integer Number_of copies=new Integer (1);

It will be recalled that it is the user U who, using a document 41, requests the execution of the common command P0 through the corresponding document interface 18. The common command P0 will call the driver using the following command:

java P_Print_1 print 2 myfile myprinter

The main method main of the driver will then be triggered. In a known way, all of the parameters of the main method main are of the String type. The main method main will call the method "print", which has varied parameters, such as:

print (Integer p1, String p2, String p3)

Each parameter type in the method main is thus transformed into the type of the corresponding parameter of the method "print." This can be done automatically in the method:

main (String argv [ ]) { ... } where the first argument is the name of the method implemented by the interface that must be called. The $(i+1)^{th}$ argument of the method main corresponds to the $i^{th}$ argument of the method called. However, its type must be changed if the argument of the method is not of the String type. In the latter example, the method main will call the method "print" of the driver in the following way:

print (new Integer(argv[1]), argv[2], argv[3];

If argv [1] does not correspond to an integer, an exception will arise and be retransmitted in the command module 12.

An example of the generation of the body of the method "print" will now be described. Let us recall that it is in the body of the method "print" that the specific command Pa ("lpr") is called. A complete mechanism in Java language allows the driver to execute the specific command and receive its results. This mechanism is described in the example of the next paragraph.

The document interface 18 of the user U calls the common command P0, which itself calls the driver 52a, after consulting its configuration file, in the following way:

java nameOfDriver nameOfMethod parametersOfMethod

One step of the method consists of automatically generating the body of the abstract method by constructing a skeleton to be completed by the designer C with the specific data of the specific command "lpr." The skeleton is created, for example, by constructing strings. In our example, the construction of the skeleton to be completed is done in the following way:

// ###### start of modification

String commandStr="###### name of the command"+" ";

commandStr=commandStr+"    "+"###### option"+p1.toString( )

;

commandStr=commandStr+" "+"###### option"+p2 commandstr=CommandStr+" "+"###### option"+p3

// ###### end of modification

For the completion of the skeleton, it is preferably indicated where the data are to be inserted and/or which data are to be inserted by the designer C. In the above example, the designer need only search in the class of the driver for the occurrence of the successive characters ######. When it finds this occurrence, the skeleton tells him which data he must insert into it, and where, in order to complete it. In the above example, he will correct the code in the following way:

// start of modification

String commandStr="lpr";

commandStr=commandStr+" "+"-#"+p1.toString( )

commandStr=commandStr+" "+"-P"+p2;

commandStr=commandStr+" "+P3;

// end of modification where commandStr will assume as a possible value

"lpr -#2 -Pprinter1 myfile".

The calling of this command will then be automatic.

We will now describe an exemplary use of the tool 60 for creating a driver skeleton generated in Java language and intended for a machine running on the operating system known by the registered trade name Windows NT.

The example begins with a simple class that contains only one method, the generalization of which is clear. The name of the class is for example "copy of file". The method of this class is "copy", which returns the value void and which has the following two parameters:

"file", of the String type, and

"destination directory", of the String type.

The designer opens the window 21 of FIG. 2 and activates, for example, a command "generate driver" (not illustrated), preferably located in the menu "Export to U". This command generates the following code:

```
interface I_Copy_of_file
{   void copy (String file; String destination_directory);
}
and
public class I_Copy_of_file_1 implements I_Copy_of_file
{   void copy (String file; String destination_directory);
    {   try
        {   Process p;
            Runtime rt = Runtime.getRuntime ( );
            // ###### start of modification
            String commandStr = "###### name of the
        command";
            commandStr = commandStr+ " " +"######option" +
        file;
            commandStr = commandStr+ " " +"######option" +
                                    destination_directory;
            // ###### end of modification
            p = rt.exec("c:\\WINNT\\System32\\cmd /c "+
            commandStr);
            BufferedReader br =
                new BufferedReader(
                    new InputStreamReader(
                        p.getInputStream( )));
            String result;
            while ((result = br.readLine( ))) != null )
            {   System.out.println("~~~~~" + result);
                StringTokenizer St =
                    new StringTokenizer ( result );
                /*
                while ( St.hasMoreTokens( ) )
                {   st = St.nextToken( );
                    System.out.println("hello\n");
                    System.out.println
                        ("token = " + st + ".");
                }
                */
            }
        }
        catch ( IOException ie )
        {   System.out.println("IO Exception") ;
        }
        catch ( SecurityException se )
        {   System.out.println ("No process");
        }
    }
    public static void main (String argv [ ] )
    {   argv[0] (argv[1], argv[2];
    }
}
```

In this code, the word "br" designates the result of the execution of the specific command. The designer C then searches for the occurrence of ###### and changes

```
            // ###### start of modification
            String commandStr = "###### name of the
        command";
            commandStr = commandStr+ " " +"###### option"+
        file;
            commandStr = commandStr+ " " +"###### option" +
                destination_directory
        ;
            // ###### end of modification
```
to
```
            // start of modification
            String commandStr = "copy";
            commandStr = commandStr+ " " +file;
            commandStr = commandStr+ " " +
            destination_directory ;
            // end of modification
```

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A method for controlling a function executable by various software products by means of commands specific to the respective software products and each command capable of having at least one option, the software products being installed in at least one machine of a computer system, comprising defining in an abstract class an abstract method for the function, the abstract method including parameters corresponding to a union, in the logical sense, of all options of a specific command, defining a common command that includes arbitrary symbols corresponding to parameters of the abstract method, creating at least one driver for implementing the abstract method in a machine, and executing by the driver one of the specific commands with options equivalent to the options of the common command.

2. A method according to claim 1, wherein equivalence between options of the specific command and options of the common command comprises creating a configuration file defining types and default values of the options of each specific command that can be executed by the driver, and determining parameters of one of said specific commands by consulting a configuration file by means of the common command.

3. A method according to claim 1, wherein a driver corresponds to a machine of the computer system.

4. A method according to claim 2, wherein a driver corresponds to a machine of the computer system.

5. A method according to claim 1, wherein the abstract class is the most abstract class that can be defined.

6. A method according to claim 2, wherein the abstract class is the most abstract class that can be defined.

7. A method according to claim 3, wherein the abstract class is the most abstract class that can be defined.

8. A method according to claim 4, wherein the abstract class is the most abstract class that can be defined.

9. A method according to claim 1, wherein the abstract class contains at least some of the methods relating to functions of a functionality common to the software products.

10. A method according to claim 2, wherein the abstract class contains all or some of the methods relating to functions of a functionality common to the software products.

11. A method according to claim 3, wherein the abstract class contains all or some of the methods relating to functions of a functionality common to the software products.

12. A method according to claim 4, wherein the abstract class contains all or some of the methods relating to functions of a functionality common to the software products.

13. A method according to claim 5, wherein the abstract class contains all or some of the methods relating to functions of a functionality common to the software products.

14. A computer system comprising at least one machine having various software products having in common at least one function executable by means of commands specific to the respective software products and each command capable of having at least one option, and adapted to implement a method for controlling a function executable by various software products by means of commands specific to the respective software products and each command capable of having at least one option, the software products being installed in at least one machine of a computer system, means for defining in an abstract class an abstract method for the function, the abstract method including parameters corresponding to a union, in the logical sense, of all options of a specific command, means for defining a common command that includes arbitrary symbols corresponding to parameters of the abstract method, means for creating at least one driver for implementing the abstract method in a machine, and means for executing by the driver one of the specific commands with options equivalent to the options of the common command.

15. A computer system, according to claim 14, further comprising means for creating a configuration file defining the types and the default values of the options of each specific command that can be executed by the driver, and means determining the parameters of one of said specific commands by consulting a configuration file by means of the common command so as to provide equivalence between the options of the specific command and the options of the common command.

16. A computer system according to claim 14 wherein a machine of the computer system includes a drive.

17. A computer system according to claim 14 wherein the abstract class is the most abstract class that can be defined.

18. A computer system according to claim 14 wherein the abstract class contains all or some of the methods relating to functions of a same functionality common to the software products.

19. A computer system as set forth in claim 17 wherein the abstract class is an interface in a programming language.

20. A method for controlling a function executable by various software products by means of commands specific to the respective software products and each command capable of having at least one option, comprising:
    defining in an abstract class an abstract method for the function, the abstract method including parameters corresponding to all of the options of a specific command, where the options are an argument that is capable of modifying the function of a specific command;
    defining a common command that includes arbitrary symbols corresponding to parameters of the abstract method;
    creating at least one driver for implementing the abstract method in a machine; and
    executing by the driver one of the specific commands with options equivalent to the options of the common command.

21. The method of claim 1, wherein the options are an argument that is capable of modifying the function of the specific command.

* * * * *